United States Patent

Johnson

[15] 3,635,455
[45] Jan. 18, 1972

[54] METHOD OF OPERATING A DRIER
[72] Inventor: Cecil J. Johnson, Columbia City, Ind.
[73] Assignee: Total Energy Corporation, Columbia City, Ind.
[22] Filed: July 7, 1970
[21] Appl. No.: 56,148

Related U.S. Application Data

[63] Continuation of Ser. No. 810,259, Mar. 25, 1969, abandoned.

[52] U.S. Cl. .................................. 263/52, 60/31, 123/119 A
[51] Int. Cl. ............................................................. F26b 3/00
[58] Field of Search ................... 263/19 C, 52; 60/31; 123/1, 123/119 A

[56] References Cited

UNITED STATES PATENTS

| | | | |
|---|---|---|---|
| 2,200,379 | 5/1940 | Williams | 60/31 X |
| 2,243,110 | 5/1941 | Madaras | 263/52 X |
| 2,253,809 | 8/1941 | Pfenninger | 263/52 X |

*Primary Examiner*—John J. Camby
*Attorney*—John J. Byrne

[57] ABSTRACT

The method of preparing gases for use in drying particulate materials wherein hot carbonaceous materials are gasified to produce carbon monoxide. The carbon monoxide is combined with oxygen and used as fuel for driving a rotary internal combustion engine. The exhaust gases from the engine are used to dry wet, particulate materials and to heat the air used in the rotary engine. The exhaust gases are then cleaned and carbon dioxide is removed by an absorption process and is recycled for use in the carbon gasification step.

10 Claims, 1 Drawing Figure

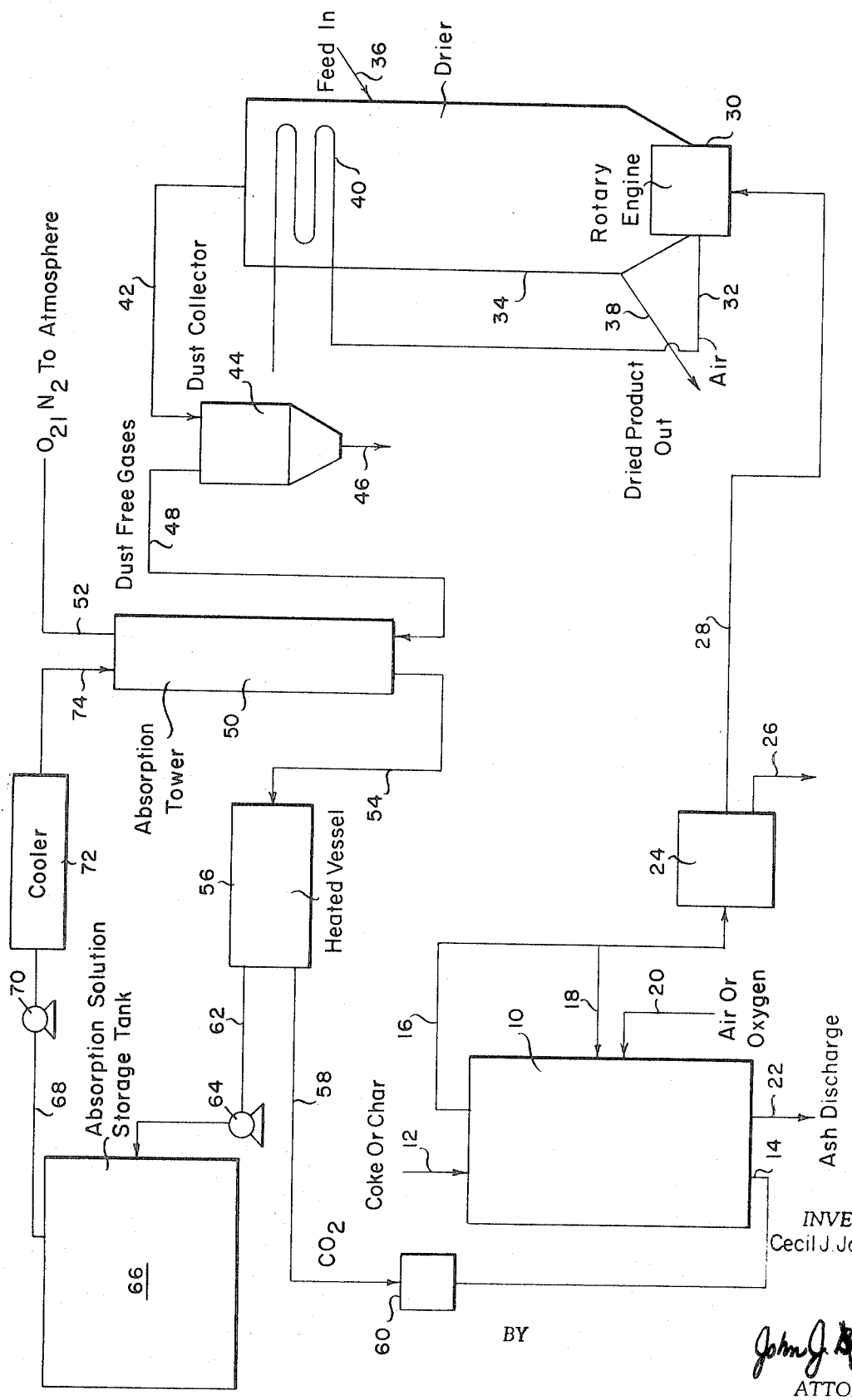

METHOD OF OPERATING A DRIER

This is a continuation of application Ser. No. 810,259 filed Mar. 25, 1969, now abandoned.

This invention relates to a method for preparing gases for use in drying wet materials. Specifically, this invention relates to drying particulate materials by using exhaust gases from a rotary internal combustion engine using carbon monoxide and air as a fuel for driving the engine.

It is well known to use exhaust gases in a drying process. Oftentimes, however, complicated heat exchangers embodying expensive apparatus must be constructed in order to prevent direct contact of the exhaust gases and the material to be dried. Most exhaust gases contain contaminants which render such direct contact prohibitive. Applicant provides by this invention exhaust gases free of sulfur contaminants, carbon particles which usually are present where hydrocarbon fuels are used and water vapor which decreases the effectiveness of the gases as a drying means.

It is an object of this invention to use desulfurized carbon monoxide with air as a fuel for driving a rotary internal combustion engine, the exhaust gases of which are used to dry wet particulate material.

It is an additional object of this invention to produce the carbon monoxide of gasifying carbon. The process used for gasifying carbon by reacting the carbon and hot carbon dioxide is described in my copending application Ser. No. 810,101, filed Mar. 25, 1969 entitled Carbon Gasification Processing Method and Apparatus.

It is a further object of this invention to use the exhaust gases in heat exchange relationship with the air to be used in the rotary engine for heating the air thereby enhancing the combustion of the carbon monoxide-air mixture in the rotary engine.

It is a further object of this invention to clean the exhaust gases after they have been used for their intended purposes and to separate the carbon dioxide therefrom by an absorption process. The carbon dioxide is recycled and is again used in the carbon gasification step to produce carbon monoxide.

Specifically, the method of preparing the drying gases comprises the steps of reacting hot carbon dioxide and carbon to produce the carbon monoxide which is then desulfurized. The carbon monoxide is combined with heated air and used as a fuel in a rotary internal combustion engine. The exhaust gases of the rotary engine are passed through a bed of wet particulate material for purposes of drying the materials. Gases are then passed through a heat exchanger for purposes of heating the air used in combination with the carbon monoxide in the internal combustion engine. Dust particles are then removed from the exhaust gases and the gases are passed through an absorber wherein sodium bicarbonate is used to absorb and separate carbon dioxide from the gases. The absorbent is passed through a heater whereupon the carbon dioxide is released by the absorbent and recycled for reaction with carbon to produce additional carbon monoxide for use in the process. The stripped absorbent is returned to a reservoir for subsequent use in the absorber.

The drawing shows schematically the steps of the method of this invention.

Referring to the drawing, a carbon gasifier is indicated by the numeral 10. Coke, carbon or other carbonaceous materials in the heated state are fed to the gasifier through line 12. Hot carbon dioxide is introduced to the bottom of the gasifier through line 14 and is forced upwardly through the bed of carbonaceous materials reacting with the carbon to form carbon monoxide. The carbon monoxide is taken off through line 16 at the top of the gasifier. The reaction that occurs is as follows: $CO_2 + C + \pi 74,960 \text{ B.t.u./lb. mol.} \rightarrow 2CO$. This reaction, as indicated, is primarily endothermic requiring a great amount of heat. In order to compensate for the loss of heat and to obtain better control over the temperature conditions of the reaction, a portion of the carbon monoxide is taken off from line 16 is reintroduced to the gasifier through line 18 along with oxygen or oxygen containing gases which are introduced through line 20. A reaction takes place between the carbon monoxide and the oxygen to produce carbon dioxide. The reaction is $2CO + O_{by} \rightarrow bCO_2 + 122,000 \text{ B.t.u./lb. mol.}$ This reaction is primarily exothermic and aids in replenishing the heat used in the above-mentioned endothermic reaction. This complete process of gasification is disclosed in my copending application mentioned earlier.

The carbon monoxide is passed through a desulfurizer 24 wherein sulphur products are removed from the gases and disposed of through line 26. The desulfurizer may be of any of the conventional types well known in the art. The desulfurized carbon monoxide continues through line 28 to a rotary internal combustion engine 30. The carbon monoxide is combined with heated air introduced into the engine through line 32 and is combusted for the purpose of driving the rotary engine. The exhaust gases from the rotary engine are passed upwardly through drier 34. The drier 34 contains a bed of particulate material which is introduced to the drier through line 36 in a wet condition and is taken from the drier through line 38 in a dried condition. The exhaust gases pass an intimate contact with the particulate material. By using carbon monoxide as the fuel for driving the rotary internal combustion engine, the exhaust gases emitted from the exhaust manifold are substantially free of contaminants including carbon particles usually present when using hydrocarbon fuels. Sulfur has previously been removed and water vapor in the exhaust gases is nonexistent because of the absence of hydrogen in the fuel. The desulfurizer subjects the gases to a scrubbing action that removes some other contaminants in addition to sulfur.

Exhaust gases pass upwardly through the drier and pass in heat exchange relationship with the coil 40 which is in communication with line 32. Air for use in the rotary internal combustion passes through the tubular coil and through line 32 to the engine. Consequently, the exhaust gases used for drying the particulate material also heat the air. By heating the air greater thermal efficiency is realized resulting in more complete combustion of the carbon monoxide.

The ease of operation is apparent since the combustion ratio of the rotary engine can be changed during operation. The engine operates on a greater air/fuel ratio, and therefore, the combustion efficiency is greater than on conventional engines. This results in a substantial lessening of the carbon monoxide present in the drying exhaust gases.

The gases are somewhat cooled from contact with the coil 40 and exit from the drier through line 42 and enter a cyclone separator wherein dust particles are removed in the conventional manner through line 46. The dust-free gases exit from the cyclone separator 44 through line 48 whereupon the gases enter on an absorption tower 50. In the absorption tower the gases come into contact with an absorbent which will absorb carbon dioxide and release it upon being heated. An absorbent such as sodium bicarbonate or other similar agents which will absorb carbon dioxide and release it upon heating is used. Gases other than carbon dioxide not absorbed by the absorbent are vented through line 52 to the atmosphere. The gases will include oxygen and nitrogen if air was as opposed to pure oxygen in the rotary engine.

The absorption solution containing the carbon dioxide is taken from the absorption tower through line 54 and passed through a heated vessel whereby the solution is heated and the hot carbon dioxide is driven off through line 58. The hot carbon dioxide is then passed through a compressor 60 and then through line 14 to be used again in the gasification process whereby additional carbon monoxide is produced. The absorption solution after leaving the vessel 56 through line 62 is pumped by means of pump 64 to reservoir 66 for subsequent reuse in the absorption tower. As needed, the solution is taken from the reservoir through lines 68 and pumped by pump 70 to a cooler 72 where the solution is cooled before entering the absorption tower through line 74.

The process disclosed herein may be a continuous process wherein particulate material is fed through the drier 34 and whereby carbon monoxide is continuously produced from the recycled carbon dioxide and the carbonaceous materials in the gasifier 10. In the alternative, the system may be operated in accordance with a batch process such that only a certain amount of carbon monoxide is produced at any one time for drying any particular batch of materials.

The process disclosed herein is quite economical in that the fuels used are so-called low-cost fuels and involve fuels that are readily available for use.

I claim:

1. A method of drying with hot gases comprising the steps of reacting hot carbon dioxide and carbon to produce carbon monoxide, passing the carbon monoxide through a desulfurizer to remove sulfur therefrom, combining the carbon monoxide with heated air and combusting the mixture to drive an internal combustion engine, passing the exhaust gases from said internal combustion engine through a bed of wet particulate materials to dry said materials and through a heat exchanger for heating the air used in the internal combustion engine, removing dust particles from said exhaust gases, separating the carbon dioxide from said exhaust gases by absorption, and recycling said separated carbon dioxide to be reacted with the hot carbon.

2. A method of drying with hot gases as defined in claim 1 wherein sodium bicarbonate is used for absorbing the carbon dioxide.

3. A method of drying with hot gases comprising the steps of operating an internal combustion engine with a carbon monoxide and air fuel mixture; and passing the exhaust gases from said internal combustion engine into heating contact with material to be dried.

4. A method of drying with hot gases as defined in claim 3 wherein said internal combustion engine is a rotary internal combustion engine.

5. A method of drying with hot gases as defined in claim 3 and including the step of separating carbon dioxide from said exhaust gases.

6. A method of drying with hot gases as defined in claim 5 wherein carbon dioxide is reacted with carbon in a carbon gasification process to produce carbon monoxide for use in driving the internal combustion engine and said separated carbon dioxide is recycled through said gasification process to produce additional carbon monoxide.

7. A method of drying with hot gases as defined in claim 3 and including the step of passing the exhaust gases in heat exchange relationship with the air used in said engine prior to its being mixed with the carbon monoxide.

8. A method of drying with hot gases as defined in claim 3 and including the step of desulfurizing the carbon monoxide prior to its use in the engine.

9. A method of drying with hot gases as defined in claim 5 wherein the carbon dioxide is separated from the exhaust gases by passing the exhaust gases through an absorbent which absorbs the carbon dioxide 10. A method of drying with hot gases as defined in claim 9 wherein the absorbent is sodium bicarbonate.

* * * * *